(12) United States Patent
Marmet et al.

(10) Patent No.: US 11,150,355 B2
(45) Date of Patent: Oct. 19, 2021

(54) MULTIPATH MANAGEMENT IN GLOBAL NAVIGATION SATELLITE SYSTEMS

(71) Applicant: CENTRE NATIONAL D'ETUDES SPATIALES, Paris (FR)

(72) Inventors: François-Xavier Marmet, Muret (FR); Cédric Rouch, Toulouse (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 205 days.

(21) Appl. No.: 16/472,152

(22) PCT Filed: Dec. 22, 2017

(86) PCT No.: PCT/EP2017/084430
§ 371 (c)(1),
(2) Date: Jun. 20, 2019

(87) PCT Pub. No.: WO2018/115465
PCT Pub. Date: Jun. 28, 2018

(65) Prior Publication Data
US 2020/0018860 A1    Jan. 16, 2020

(30) Foreign Application Priority Data

Dec. 23, 2016    (EP) .................................... 16306802

(51) Int. Cl.
*G01S 19/22*   (2010.01)
*G01S 19/11*   (2010.01)
(Continued)

(52) U.S. Cl.
CPC .............. *G01S 19/22* (2013.01); *G01S 19/11* (2013.01); *G01S 19/34* (2013.01); *G01S 19/36* (2013.01)

(58) Field of Classification Search
CPC .......... G01S 19/22; G01S 19/11; G01S 19/34; G01S 19/36; G01S 19/29; G01S 19/30; G01S 19/08; G01S 13/003
(Continued)

(56) References Cited

U.S. PATENT DOCUMENTS

| 6,421,000 B1 | 7/2002 | McDowell |
| 2010/0178934 A1 | 7/2010 | Moeglein et al. |

(Continued)

FOREIGN PATENT DOCUMENTS

| JP | 2002-214321 A |   | 7/2002 |
| KR | 2017-31679 S | * | 7/2016 |

OTHER PUBLICATIONS

Irish, et al., "Using Crowdsourced Satellite SNR Measurements for 3D Mapping and Real-time GNSS Positioning Improvement", pp. 5-8, Sep. 7, 2014.

*Primary Examiner* — Harry K Liu
(74) *Attorney, Agent, or Firm* — Burris Law, PLLC

(57) ABSTRACT

A device for handling multipath of a G.N.S.S. signal, is configured to: determine a spatial position, a clock time and measured multipath parameters comprising a relative delay and relative amplitude; communicate to a remote server the spatial position, clock time and multipath parameters; and receive processed multipath parameters as determined by the remote server. Systems comprising a plurality of such devices and their variants are described. Further aspects are described, in particular the exclusion of one or more satellites, the use of threshold schemes, pull/push modes, configurable refresh rates, quantization of positions, activation of additional sensors, filtering options, determination of merit factors for example as a function of the number of (Continued)

satellites in view and/or of signal-to-noise ratio, peer-to-peer schemes, as well as graphical display, audible sound or haptic feedbacks.

15 Claims, 4 Drawing Sheets

(51) Int. Cl.
    *G01S 19/34*     (2010.01)
    *G01S 19/36*     (2010.01)

(58) Field of Classification Search
    USPC .................................................. 342/357.61
    See application file for complete search history.

(56) References Cited

U.S. PATENT DOCUMENTS

| | | | | |
|---|---|---|---|---|
| 2015/0334678 A1* | 11/2015 | MacGougan | ........... | G01S 19/49 701/451 |
| 2016/0198339 A1* | 7/2016 | Siomina | ................. | H04W 8/24 455/41.2 |
| 2017/0357005 A1* | 12/2017 | Diamond | ................ | G01S 19/22 |

* cited by examiner

| Data for Day of Year 253 of Year 2015 | | 331 | | 332 | | | | | |
|---|---|---|---|---|---|---|---|---|---|
| User position (on the grid) | {az ; el} (on the grid) | GNSS sat. number | MP1 delay [m] | | MP1 amplitude [normalized] | | MP2 delay [m] | | ... |
| | | 319 | 321 | 322 | | | | | |
| | | | Mean (M) | Variance (V) | M | V | M | V | |
| 5A ; 8B | 1R ; 3C | 1 | 2.50 | 0.53 | 0.17 | 0.02 | 10.7 | 0.53 | |
| | | 12 | 15.70 | 2.21 | 0.55 | 0.10 | 31.6 | 2.21 | |
| | | 27 | 54.80 | 3.98 | 0.21 | 0.08 | 102.4 | 3.98 | |
| 6C ; 9C | 2K ; 5M | 5 | ... | | | | | | |
| | | 18 | ... | | | | | | |
| | | 21 | ... | | | | | | |
| | | 32 | ... | | | | | | |
| ... | ... | ... | | | | | | | |

311 points to the 5A;8B row group. 312 points to the 6C;9C row group.

US 11,150,355 B2

MULTIPATH MANAGEMENT IN GLOBAL NAVIGATION SATELLITE SYSTEMS

CROSS-REFERENCE TO RELATED APPLICATIONS

This application is a National Stage of International patent application PCT/EP2017/084430, filed on Dec. 22, 2017, which claims priority to foreign European patent application No. EP 16306802.6, filed on Dec. 23, 2016, the disclosures of which are incorporated by reference in their entirety.

TECHNICAL FIELD

This patent relates to the field of digital data processing and more particularly to Global Navigation Satellite Systems (G.N.S.S.)

BACKGROUND

A G.N.S.S. receiver position is generally computed based on data received from G.N.S.S. satellites. G.N.S.S. receivers usually make corrections for receiver clock errors and other effects but there are still residual errors which are not corrected.

While open environments are generally not subject to impairments such as multipath and offer a high number of satellites in view (most of them at medium to high elevations), in constrained environments (e.g. urban environments), there are only few satellites in view and low elevation satellites hardly can be discarded. Constrained environments are heavily impaired by time-varying multipath. Precisely in these environments, certain applications of G.N.S.S. can require improved accuracy (e.g. automated or automatic car).

Multipath is a dominant source of ranging error in G.N.S.S. Multipath interference occurs when the user device receives reflected signals (e.g. from the ground, buildings, trees, host-vehicle body, etc) in addition to the direct line-of-sight L.O.S. signal. Multipath signals destroy the correlation function shape used for time delay estimation and in fine decrease positioning accuracy.

Some approaches to mitigate multipath are described in the patent literature but present limitations. For example U.S. Pat. No. 6,421,000 entitled "GPS multipath mitigation using a multi-element antenna array" requires a specific antenna, i.e. a modified G.N.S.S. device.

There is a need for advanced methods and systems to mitigate multipath in standard G.N.S.S. equipment.

SUMMARY

There is disclosed a device for handling multipath of a G.N.S.S. signal, said device being configured to:—determine a spatial position, a clock time and measured multipath parameters comprising a relative delay and relative amplitude;—communicate to a remote server said spatial position, clock time and multipath parameters; and—receive processed multipath parameters as determined by the remote server. Examples of systems comprising a plurality of such devices (and their variants) are described. Further optional aspects are described, for example the exclusion of one or more satellites, the use of threshold schemes, pull/push modes, configurable refresh rates, quantization of positions, activation of additional sensors, filtering options, determination of merit factors for example as a function of the number of satellites in view and/or of signal-to-noise ratio, peer-to-peer schemes, as well as graphical display, audible sound or haptic feedbacks.

There are disclosed steps of estimating multipath parameters, in combination with G.N.S.S. processing steps. Estimating multipath parameters can be performed in various ways, for example with spectrum-based techniques Advantageously, embodiments of the invention allow establish multipath maps, which can be used to correct local measures, and/or to improve PVT estimation and/or to adapt the navigation strategy. Updated maps can be retrieved on demand (occasionally or regularly).

Advantageously, in some embodiments, a multipath map does not change much over time (buildings and trees evolve slowly over time) and thus can be embedded in G.N.S.S. receivers (at least in part).

Advantageously, in crowded areas, i.e. with more data, the refresh rate of maps and following the effectiveness of corrections can be superior. In some embodiments, multipath data can be collected for every possible elevation and azimuth for every possible G.N.S.S. satellite.

Advantageously, some embodiments of the invention require reduced amount of data to be sent and/or received by users.

Advantageously, some embodiments of the invention do not require bilateral and/or real-time data communication.

Advantageously, embodiments of the invention allow calculating accuracy indicators based on elevation mask i.e. relative position of the satellites (DOP) and User Equivalent Range Error (UERE), wherein the values of UERE are refined.

Advantageously, some embodiments of the invention do not require modified G.N.S.S. devices, since intensive processing and storage operations can be performed in the cloud or in remotely accessed servers.

Advantageously, embodiments of the invention are adaptive to (slow) environment changes (e.g. new buildings).

Advantageously, embodiments of the invention can use and leverage most common G.N.S.S. signals and/or constellations.

Advantageously, embodiments of the invention can be used by urban planners or architects for urban or buildings' conception or optimization.

BRIEF DESCRIPTION OF DRAWINGS

Embodiments of the present invention will now be described by way of example with reference to the accompanying drawings in which like references denote similar elements, and in which.

DETAILED DESCRIPTION

Data which is communicated from a receiver to a server hereinafter can be referred to as "multipath parameter values" or "measured multipath". Said data and values can depend on functionalities implemented on a receiver, for example to identify or estimate multipath. Some receivers can be diversely provided with such functionalities.

Data communicated by a server to one or more receivers can be referred to as "processed multipath" (processing steps have been performed on collected measures) or "computed multipath" or "multipath knowledge" or "server's multipath" or "multipath (consolidated) map".

Figure 1:
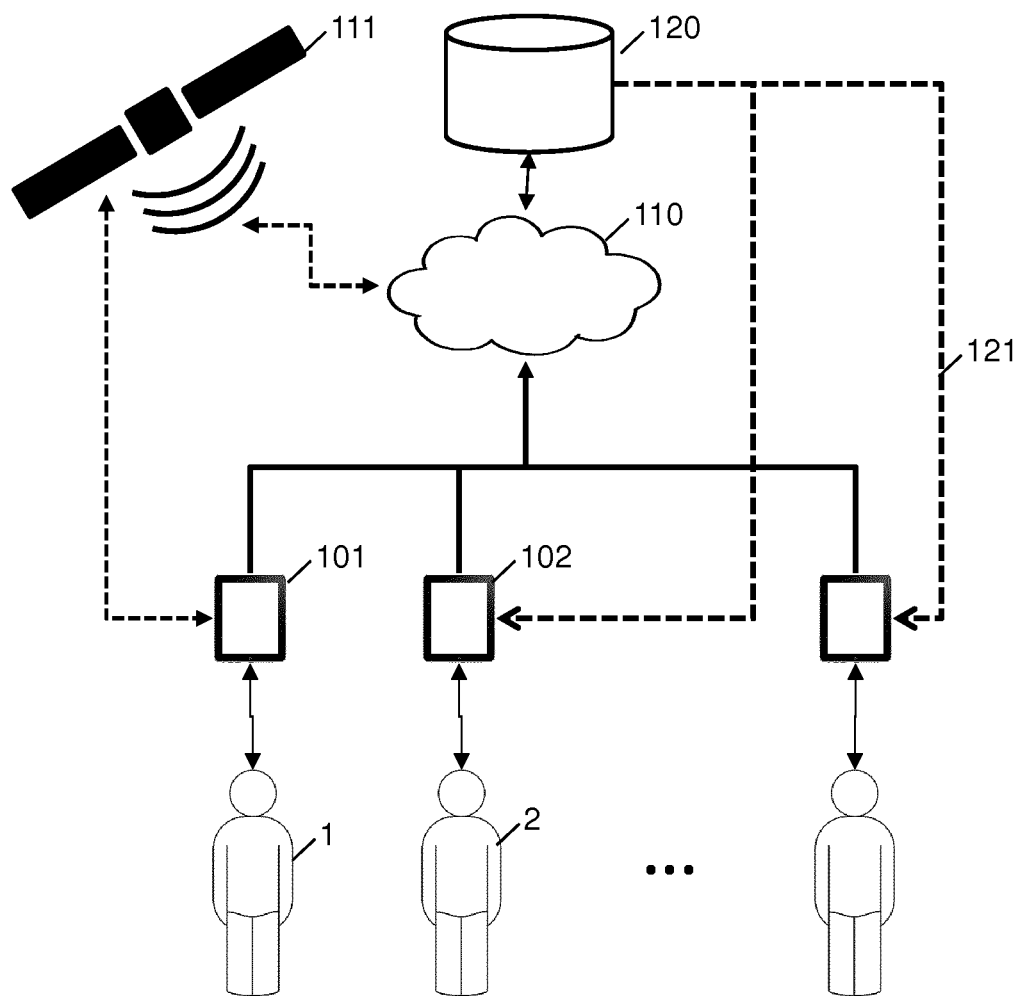
FIG. 1 illustrates the general environment of the invention.

FIG. 1 illustrates the general environment of the invention.

The FIG. 1 shows one or more users (1, 2) equipped with one or more G.N.S.S. receivers (101, 102), e.g. dedicated hardware, smartphones, etc.

A G.N.S.S. receiver can be embedded or carried out in a (manned or unmanned) car, boat, aircraft, drone, robot or any transportation system. A G.N.S.S. receiver also can be carried out by a human user, or an animal.

Said G.N.S.S. receivers access one or more satellite constellations (111) (e.g. GPS, GLONASS, Galileo or Beidou). One or more of such G.N.S.S. receivers are—directly (e.g. 3G, 4G, LTE, 5G, etc) or indirectly (e.g. bridge by Wifi or Bluetooth)—communicating with one or more servers (120).

A receiver considered by the invention can be provided with different technological capabilities (e.g. processing, storage, positioning, antennas, etc). A minima, in order to be able to cooperate, receivers shall be provided with download communication capabilities. In some cases, a receiver can upload/transmit data (bridges between different protocols are nevertheless possible). Some receivers according to the invention can thus be (implicitly) emitters. Some receivers participating in the described crowd-sourcing schemes can comprise diverse positioning processing capabilities. These roles or functions can be independently performed (and be further combined). Some receivers can be "naked RFFE" receivers, i.e. receivers which only perform measurements, i.e. RF signal digitization (receivers are configured to communicate their measures at least within short-range distance with other receivers provided with (long-range) communication capabilities towards the server). Some receivers, which by themselves can be unable to measure any G.N.S.S. signal or not those for positioning, can use multipath and/or positioning measures of other receivers (they can act as relays, in a structured manner, or by opportunistic behavior). Some receivers can perform both functions of measurement and transmission of these measurements to the server.

Some receivers can comprise a display, when some feedback (or retroaction or interaction) is needed with a (human) user. Some other receivers can be provided without a display (or equivalent means). A receiver can be passive (it can only handle data received from other receivers and/or servers). A receiver can be "active" (or "contributor receiver"), e.g. it can measure multipath (according to different levels of performances). A receiver can be successively or simultaneously active and passive (measuring multipath and receiving data from the server).

Regarding the details of measurements being performed by a receiver, different variants are possible for a given satellite and for given space-time coordinates. A receiver can assess the mere presence of multipath (i.e. by a binary answer e.g. yes present, no absent), for example by using double correlation). By order of increasing complexity, performances of receivers are now described. A receiver can determine a severity indicator. Thresholds schemes can be applied. For example, if two paths for which amplitude and relative delays are in excess of predefined thresholds (e.g. 0, 3 and 10 meters), the environment will be qualified as severe, else as interference-free. A receiver can determine delay and amplitude of multipath (e.g. with MEDLL or CEPSTRUM). Some receivers can even estimate the number of reflections.

The expression "the server", used thereinafter, designates the collection of one or more physical servers (120). The perimeter of said collection can evolve over time and/or space. Servers can be remotely accessed (e.g. APIs) and comprise computing and memory/storage resources. One or more servers can receive data from receivers, compute multipath correction values and serve back receivers.

In some embodiments, communications between receivers and servers can be unidirectional (data push). In some embodiments, communications are bidirectional (data pull). Multipath parameters can be pushed (e.g. by the server or another linked device) and/or pulled (e.g. requested or retrieved by the G.N.S.S. receiver to the server).

In an embodiment, a G.N.S.S. receiver (for example 101) computes or determines its position (P), velocity (V) and (clock) time (T). This spatial position can be refreshed over time at variable rates e.g. at 1 Hz (1 time per second). The G.N.S.S. also can compute multipath parameters, in particular comprising relative delay and relative amplitude. Data comprising {P; V; T; relative amplitude; relative delay} is stored in the G.N.S.S. device. In some embodiments, this data represents a small amount of data (order of magnitude of 1 megabyte for 24 hours).

The individual G.N.S.S. 101 then connects to a server (120) (or servers) via I/O communication resources (e.g. in 3G, 4G, 5G, Wifi, etc) and uploads its collected data (for example since its last connection, or the entirety of its records). Such a connection can occur from time to time, i.e. be intermittent or regular or irregular or even opportunistic when a connection is possible.

Data is collected by the one or more servers (120) from a plurality of end-user individual G.N.S.S. devices. Data is later analyzed and multipath mitigation values can be determined for each point of the grid (or map).

Time passing by and/or by accumulating data, reliable multipath maps can be created.

The more traffic, the more data. The refresh rate and accuracy of multipath correction values is generally proportional to traffic. Where intense traffic can be observed, lots of data can be used to mitigate multipath. In urban areas associated with dense traffic (e.g. highways, shopping centers, etc), significant amounts of data can be collected and efficient further multipath management (e.g. correction, suppression, mitigation, etc) can be performed. In deserted or empty areas, the gathering of data may take some more time (but at least some data is available).

In an embodiment, uploaded data can be anonymized (or privacy can be preserved).

Aggregated or collected data can then be processed. In an embodiment, individual uploaded data is post-processed, since data from one single G.N.S.S. receiver is likely to be impaired by errors. Multipath parameters estimation is indeed dependent on the actual receiver that collected data (especially amplitude).

In an embodiment, user positions and/or G.N.S.S. satellite positions are quantized (or discretized or quantified): positions are restricted to discrete values rather than to a continuous set of values. This minimizes the amount of data to be manipulated and also averages or smoothes uncertainties in positioning.

In an embodiment, statistical analysis is performed on collected data.

Various statistical tests and procedures can be performed on collected data. In an embodiment, the mean and variance of an over bounding or best fitting Gaussian distribution can be determined. In some embodiments, other steps can be used including but not limited to analysis of variance, multivariate analyses, Chi-squared tests, correlation, factor analysis, mean square weighted deviation, regression analysis, conjoint analysis, etc.).

In particular, abnormal and/or excessive multipath values ("outliers") can be filtered out.

For example, a G.N.S.S. device located in the vicinity of a truck may record high values of multipath which wouldn't be seen by other devices at a later moment. Data filters can be configured in different manners, e.g. upstream before data upload or downstream because of probable inconsistencies with other devices' data. In an embodiment, outliers can be removed by using predefined thresholds or ranges of thresholds. For example, if a multipath is rarely detected at a given location (under a predefined threshold) it would then be ignored or filtered out. In other words, "stable" multipath can be learned and further corrected while "temporary" or "peaks" of multipath can be eliminated.

In an embodiment, statistical properties can be determined over a predefined relevant time period or interval (which for example can be dependent of the considered geolocation). For example, in a crowded area in an important city, the time period may be sufficient to get relevant statistics but short enough to timely detect and capture usual and most significant changes in the street (e.g. moving trucks, roadwork's, etc). In some embodiments, meteorological conditions can play a secondary role (e.g. snow).

All influences being taken into account, the refresh rate of data can range from one hour to a few days.

In some embodiments, the refresh rate is predefined and occurs at regular time intervals. In some embodiments, the refresh rate is adaptive (it can be a function of the quantified confidence in accuracy and/or reliability of the estimated multipath correction value, it can be a function of the traffic in a given area, it can be configured according to the knowledge of current roadwork's from external databases. etc).

Data exchanged between servers and receivers can be filtered upstream (i.e. by a receiver) and/or downstream (i.e. by a server). Criteria to filter out data comprise distance proximity criterion, trust/confidence level in the considered G.N.S.S. receiver, road geometries, etc.

After data has been collected or otherwise aggregated data and post-processed, data can be communicated back (121) to one or more G.N.S.S. receivers.

Data can be sent using a diversity of data communication channels or links.

Server data communicated to receivers can comprise: a) one or more indicators (e.g. a value or a range of values, a binary response, etc), for example "Area without significant multipath", "Area with low multipath", "High multipath", "Caution"; and/or b) parameters related to local multipath, including statistical moments (e.g. absolute value, mean, variance, minimum, maximum); and/or c) multipath correction values (directly) and/or d) other data (confidence thresholds, credentials, subscription and authentication data, etc).

Data communicated by a server to one or more receivers can be variable (in space, in time). Since a server collects and manipulates collected data received from a plurality of receivers, the output data of a server to a receiver can vary i) over time, and/or ii) in response to receivers' requests and/or iii) depending on computed multipath and/or iv) depending on other factors (e.g. a subscription "accuracy on demand").

In other words, the entire multipath "knowledge"—or only parts of it—can be selectively redistributed to receivers. The use of data computed by the server can be variable in time and space; for example: i) a receiver can use server's data to attenuate or correct or suppress multipath affecting local measures, and/or ii) a receiver can use server's data to improve its positioning by excluding one or more satellites associated with an azimuth/elevation for which the server has determined signal degradations caused by multipath, and/or iii) in response to server's data, a receiver can (spontaneously) power-off or hibernate to spare battery (in a variant, shutdown or hibernation commands also can be sent proactively; in a variant, other types of positioning sensors can be used). In some embodiments, the consolidated/processed multipath can even remain undistributed (e.g. the multipath map can be used for urban planners, for example to avoid building a metallic structure for a sensitive area).

Data received from the server can be displayed "natively" i.e. directly or without modification, so as to inform the user.

Data received from the server can trigger activation of (fallback) modes, wherein additional or complimentary or substitution means or steps can performed to improve the accuracy and/or reliability of the determination of the position (e.g. odometry, inertia).

In an embodiment, communicated data can comprise the totality of gathered data and each G.N.S.S. receiver can adapt to this "collective" data.

In an embodiment, the one or more servers can send customized or personalized data (e.g. by anticipating the next locations of a given G.N.S.S. receiver). For example, only relevant positions (e.g. determined by the application of predefined criteria) can be sent to a given G.N.S.S. device. For example, a criterion to select or filter data can be a distance proximity criterion (e.g. communicating multipath correction values applicable for a particular G.N.S.S. receiver whose location is known). Communicated data can leave open possibilities for moves of said G.N.S.S. receiver (mitigation correction values close to the current position can be communicated in all spatial directions within a predefined range, for example as a function of moving speed). Communicated data can possibly be further filtered by taking into account road geometries and/or by anticipating trajectories (e.g. knowing final destination, etc.).

In an embodiment, provided with general or specific data, a particular G.N.S.S. device can then set expected UERE for a given satellite in accordance with the received data, current location and current G.N.S.S. satellites Az and El (with "Az" for azimuth of the emitting satellite seen by the G.N.S.S. receiver; and with "El" for elevation of the emitting satellite seen by the G.N.S.S. receiver). The G.N.S.S. device thus can improve the accuracy of its positioning.

The G.N.S.S. device (or external connected devices) optionally can perform other steps.

In an embodiment, in response to determining that a particular area is associated with intense multipath (for example in excess of a predefined threshold), a G.N.S.S. device can trigger the activation one or more available sensors (e.g. X and Y) to fuse them with G.N.S.S. data (if X and Y were previously turned off to save power and if X and Y are sensors which are not impaired by multipath (e.g. IMU)). Sensors can be embedded in the G.N.S.S. receiver, but can also be accessed in/from other devices (if the G.N.S.S. receiver is a connected device).

In an embodiment, if and/or when determining the presence of multipath above a predefined threshold, it can be triggered a step of initializing a multipath mitigation algorithm selected from the group comprising e.g. narrow correlators and Multipath Estimating Delay Lock Loop (MEDLL). MEDLL iteratively estimates the amplitude, delay and phase of each multipath component using maximum likelihood criteria. The contribution to the correlation function is subtracted from the measured correlation function. The estimate of the direct path correlation function is then left and the code error can be computed.

In an embodiment, multipath management or handling steps according to the invention can be activated (or favored) when a Binary Offset Carrier (B.O.C.) is tracked by the receiver (or a variant thereof, e.g. SinBOC, CosBOC, AltBOC). B.O.C. is a modulation (split-spectrum modulation) used in recent generations which is sensitive to multipath.

In an embodiment, a satellite can be excluded when a sufficient number of successive abnormal values are observed. Criterion for example can include time intervals to compare data, or acceptable numerical ranges. Averaging values can allow excluding outliers (data values and/or sources of data, i.e. satellites).

An outlier can be excluded by a G.N.S.S. receiver and said feedback can be consolidated by the remote server (as votes or voting mechanisms), which can then handle an analysis and exclude one or more satellites. The remote server can analyze the configuration of the constellation. The remote server can perform "map matching" steps.

In an embodiment, in combination with the disclosed steps, one or more "BOC ambiguity resolution" techniques (collection of steps) can be performed, for example for one or more satellites which are prone to be severely impaired by multipath. As a result one or more satellites can be excluded.

In an embodiment, an ambiguity resolution technique can consist in using a G.N.S.S. receiver comprising a circuit configured to receive a positioning signal comprising a carrier modulated by a subcarrier and a pseudo-random noise code, a subcarrier and code tracking loop, comprising a first discrimination circuit, configured to calculate a first pseudo range from said received positioning signal and a first reference signal, a code tracking loop, comprising a second discrimination circuit, configured to calculate a second pseudo range from said received positioning signal and a second reference signal, a calculation circuit configured to evaluate a difference between said first pseudo range and said second pseudo range, and to modify the output of the first discrimination circuit accordingly. In some developments, there can be used one or more of a non-ambiguous pseudo ranges, ambiguous discriminator values, particular offsets during predefined periods of time, along various thresholds. The receiver can comprise a second calculation circuit configured to modify the second pseudo range by smoothing a plurality of successive second pseudo range values (e.g. with the value of the first pseudo range). The spectrum of the G.N.S.S. positioning signal can comprise two lobes, the code tracking loop being configured to calculate the second pseudo range from a single lobe of the G.N.S.S. positioning signal and/or the code tracking loop being configured to calculate the second pseudo range from both lobes of the G.N.S.S. positioning signal.

In an embodiment, an ambiguity resolution technique can consist in using a receiver for tracking a G.N.S.S. positioning signal comprising a carrier modulated by a subcarrier and a spreading code, the receiver comprising at least one tracking loop configured to calculate a first pseudo range from said G.N.S.S. positioning signal; a first discrimination circuit configured to calculate an ambiguous discriminator value from the subcarrier and the spreading code of said G.N.S.S. positioning signal; a calculation circuit configured to calculate a value representative of a tracking error of said tracking loop; a second discrimination circuit configured to select one of said ambiguous discriminator value and said value calculated by the calculation circuit, and to generate a first non-ambiguous discriminator value, an amplitude of which is based on an amplitude of the selected value, and a sign of which is a sign of said value calculated by the calculation circuit. In some developments, there can be used one or more of a control signal to select between the ambiguous discriminator value and the value calculated by the calculation circuit, a step of smoothing the value calculated over a plurality of consecutive measurements. The calculation circuit can be configured to calculate a second non-ambiguous discriminator from correlations between the subcarrier and spreading code of the G.N.S.S. positioning signal and a reference signal. A second non-ambiguous discriminator can be determined from a correlation between the spreading code of the G.N.S.S. positioning signal and a reference signal. Various differences between pseudo-range values can be determined.

In an embodiment, an ambiguity resolution technique can consist in using a G.N.S.S. receiver, comprising a plurality of circuits configured to receive positioning signals comprising a carrier modulated by a subcarrier and a pseudo-random noise code, from a plurality of satellites in G.N.S.S. constellations, a plurality of first signal processing channels configured for processing a first selection of said positioning signals and determining associated first pseudo ranges, at least one second signal processing channel configured for processing a second selection of said positioning signals, and determining associated second pseudo ranges, and a computer logic configured for calculating an unbiased position and time measurement, wherein—the first pseudo ranges are non-ambiguous pseudo ranges determined from the subcarrier and code of positioning signals, the second pseudo ranges are ambiguous pseudo ranges determined from the subcarrier and code of positioning signals, the computer logic is configured to calculate the unbiased position and time measurement from the first and second pseudo ranges, all said pseudo ranges being determined from positioning signals originating from distinct satellites. In some developments, there can be used one or more of an unbiased position and time measurement using a PVT algorithm calculation resolving pseudo range ambiguities; at least four first signal processing channels; an index of quality of signals being calculated from at least one of power signal, carrier to noise ratio, satellite elevation angle, multipath reflection, geometric dilution of precision and a confidence level. The positioning signals processed by the first and second processing channels can originate from satellites of distinct G.N.S.S. constellations.

In an embodiment, multipath presence (given a predefined value, i.e. a binary response yes or no) or a multipath intensity level or "severity" (quantization of multipath impact) can be rendered to the user of the G.N.S.S. device (e.g. graphical display of an icon, audible alarm, haptic feedback, etc), thereby indicating loss of reliability of the positioning accuracy. In an embodiment, the severity can be quantified in three levels, e.g. "severe", "low" and "no impact".

Severity levels can be absolute (e.g. whatever the map) or be relative (e.g. certain locations can have different thresholds, for example in rural areas by contrast with dense urban areas).

In some embodiments, data download can be provided for a fee. In some embodiment, data can be segmented in qualitative levels (e.g. detailed information behind a pay wall, while basic data can be provided for free). In some embodiments, credits or micropayments can be implemented (accuracy on demand).

In some embodiments, data can be exchanged in a centralized manner (one or more servers). In some embodiments, data can be exchanged in a decentralized and/or distributed manner (e.g. peer-to-peer protocols). Data communication also can be hybrid (with both centralized and distributed features), e.g. with particular servers being associated with higher trust/confidence levels and privileges/roles and with the use of peer-to-peer exchanges between G.N.S.S. receivers).

In an embodiment, batch comparisons of data sets can provide valuable information (e.g. high-level monitoring of urban areas). For example, comparing daily data sets for a given position and for every G.N.S.S. satellites (az and el) can lead to determine that part of a building has been added or removed or changed (e.g. brick instead of concrete walls) or that a row of trees has been cut down or planted or has grown up).

Various embodiments are now described.

Data received from a server by a receiver can trigger activation of means/steps to improve the determination of pseudo-distances (e.g. narrow correlators, handling of secondary peaks, BOC tracking).

Data received from a server by a receiver can be directly used to correct pseudo-distances initially determined by the receiver on its own.

In an embodiment (passive mode), a receiver uses data received from the server (for example a severity indicator) and restitutes the corresponding information to the user of the receiver (the user decides further whether the positioning data can be trusted or not).

In an embodiment (contributor mode), a receiver performs measures as a "naked RFFE", and further uploads (directly or indirectly via another receiver) its measures to the server. The receiver can ignore or be unable to receive data from the server.

In an embodiment (assisted mode), a receiver determines the mere presence of multipath (binary answer) on its own. The receiver receives a multipath indicator for its local and current area (as downloaded from a server). In response to said reception, the receiver can modify its operational state upon receiving indication that multipath is about to get severe (improved BOC tracking, use of «narrow correlators», use of another positioning technique such as odometry).

In an embodiment (slave mode), a receiver uses data communicated by a server, for example statistics related to relative amplitudes and delays so as to improve the UERE estimation and in fine to better estimate its position and/or position uncertainty. Optionally, the associated uncertainty can be displayed to the human user so as to contextualize positioning.

Figures 2, 3:
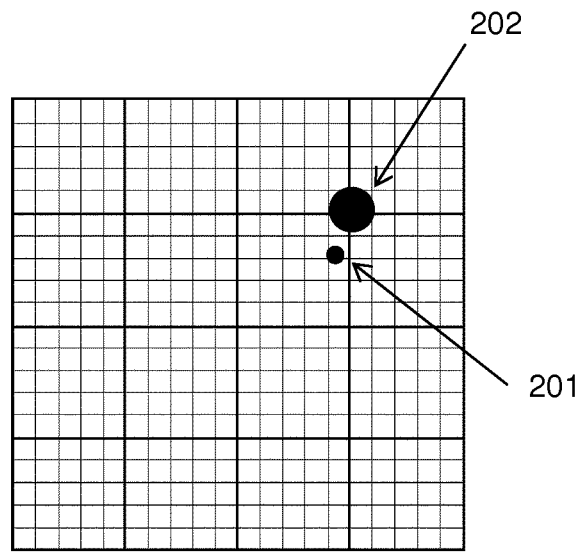
FIG. 2 shows an example of a quantization of the positions of G.N.S.S. receivers and/or satellites.
FIG. 3 illustrates a specific embodiment of the collection of data from a G.N.S.S. receiver.

FIG. 2 shows such a discretization or quantization. The actual position of a given G.N.S.S. receiver (201) can be mapped onto a closest point (202). Satellite positions also can be discretized (not shown). Discretization or quantization of satellites' Az and El advantageously fulfils the same need for lightweight data and synthesis.

Advantageously, such an embodiment allows to "smooth" the computed receivers' positions (positions to which the multipath estimations are related), since not doing this would mean that all positions can be slightly different, possibly decreasing the efficiency of the synthesis of data. Since computed positions can be impaired by multipath effect, such a quantization (or discretization) corresponds to a map matching (correspondence with real maps). For example, after collecting data and quantizing positions, multipath will not be determined within the centre iof a building but will realistically be associated to a position on a road next to this building.

FIG. 3 illustrates a specific embodiment of the collection of data from G.N.S.S.

The table 300 of the example shows different values associated with recorded user positions (311, 312) on the spatially quantized ("discrete grid" (associated with the constellation configuration 319). Each G.N.S.S./user position e.g. {5A; 8B} (311) is associated with quantized satellite positions e.g. {1R; 3C} (319), corresponding to values of {Az,El} on the grid.

In an embodiment, statistical analysis can be performed on collected data.

In the example, arithmetic mean (M) 321 and variance (V) 322 (e.g. of a fitting Gaussian distribution) can be determined and associated with each data position log or record. Delay estimation 331 can be generally consistent between different users, but the amplitude estimation 332 can vary (for example in function of antenna gain).

Given these recorded positions, multipath correction values can be determined for each position of the grid (quantized map).

Figure 4:
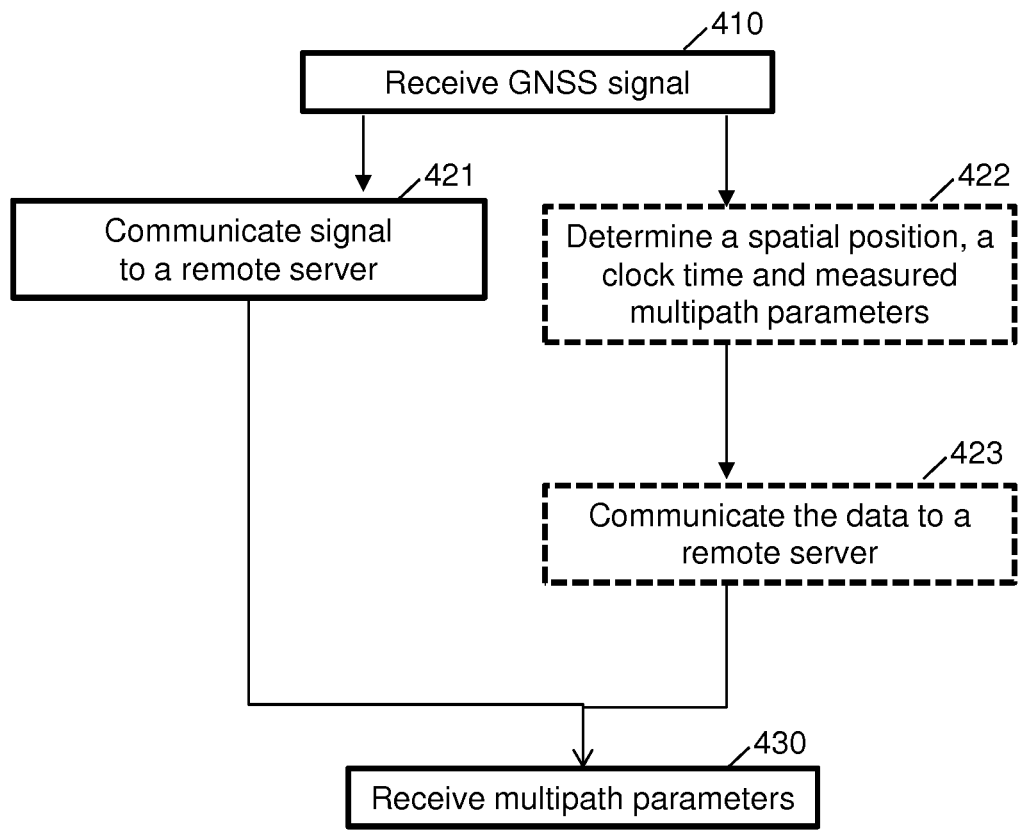
FIG. 4 shows examples of the steps of the method according to an embodiment of the invention.

FIG. 4 shows examples of the steps of the method according to an embodiment of the invention.

There is disclosed a device for handling multipath of a G.N.S.S. signal, said device being configured to:—receive 410 a G.N.S.S. signal;—communicate 421 said G.N.S.S. signal to a remote server; and—receive 430 processed multipath parameters as determined by the remote server. The device can thus act as a "relay" ("naked RFFE" receiver).

In an embodiment, said device being further configured to:—determine 421 a spatial position, a clock time and measured multipath parameters comprising a relative delay and relative amplitude;—communicate 422 to a remote server said spatial position, clock time and multipath parameters; and—receive 430 processed multipath parameters as determined by the remote server. The device can be a "contributor".

The expression "handling multipath" designates actions performed at receiver and/or server levels, and encompasses mitigating multipath (e.g. attenuating, correcting, suppressing, etc) and/or taking advantage of (consolidated or processed or computed) multipath, as determined by the server collecting multipath individual and local measures.

The spatial position is generally a position in 2D (X,Y), but in some embodiments altitude can be taken into account (X, Y, Z). The clock time can be a shared clock time, an absolute clock time, constellation clock time, etc.

There is further disclosed a system comprising a plurality of devices (a "device" hereinafter designates a device of relay and/or contributor types).

In an embodiment, the remote server is configured to collect data from a plurality of devices, said data comprising a plurality of positions, clock times and/or multipath parameters.

In an embodiment, the remote server is configured to perform statistical analysis on said collected data.

In an embodiment, a device and/or the remote server are configured to exclude one or more satellites when one or more multipath parameters are determined to be superior to a predefined value.

In an embodiment, the remote server is configured to push multipath parameters to at least one device and/or wherein at least one device is configured to pull multipath parameters from the remote server.

In an embodiment, multipath parameters are determined at a configurable refresh rate.

In an embodiment, a device is configured to use processed multipath parameters communicated by the remote server.

In an embodiment, a device is configured to correct one or more pseudo-distances with said processed multipath parameters to calculate its spatial position.

In an embodiment, a device is configured to power off one or more its circuits when processed multipath parameters exceed one or more predefined values.

In an embodiment, a device (relay and/or contributor) is configured to request position information from another device.

In an embodiment, a device is configured to activate one or more embedded sensors when multipath parameters exceed one or more predefined thresholds.

In an embodiment, a spatial position and/or a satellite position is quantized.

In an embodiment, a spatial position and/or a clock time is filtered out before communication to the server.

In an embodiment, a device (relay and/or contributor) is configured to use narrow correlators and/or Multipath Estimating Delay Lock Loop to further improve multipath determination.

In an embodiment, a device (relay and/or contributor) and/or the remote server are configured to use improved ambiguity resolution when a Binary Offset Carrier signal is detected.

In an embodiment, a device and/or the remote server are configured to maximize the number of multipath estimations, and/or to maximize the number of constellations being used, and/or the step of maximizing the number of signal frequencies.

In an embodiment, a device and/or the remote server are configured to estimate a merit factor of multipath parameters as a function of the number of satellites in view and/or of signal-to-noise ratio.

In an embodiment, a device (relay and/or contributor) and/or the remote server are configured to apply Multipath Estimating Delay Lock Loop.

In an embodiment, at least two devices are in direct communication.

In an embodiment, multipath is quantized into severity levels and a device and/or the remote server are configured to restitute the severity level for a given spatial position by graphical display, audible sound, haptic feedback or a combination thereof.

There is described a method of handling multipath in a Global Navigation Satellite System G.N.S.S. receiver among a plurality of receivers, said method comprising the steps of:—in at least one receiver, determining a spatial position, a clock time and initial multipath parameters comprising a relative delay and a relative amplitude;—communicating to a remote server said spatial position, clock time and multipath parameters;—determining in said remote server final multipath parameters.

In a development, the method further comprises the step of the remote server collecting data from a plurality of G.N.S.S. receivers, said data comprising a plurality of positions, clock times and multipath parameters.

In a development, the method further comprises the step of the remote server performing statistical analysis on said collected data.

In a development, performing statistical analysis comprises the step of the server excluding one or more satellites when one or more multipath parameters are determined to be superior to a predefined value.

In a development, the server pushes at least one parameter to at least one of the G.N.S.S. receivers and/or at least one G.N.S.S. receiver pulls at least one multipath parameter from the server.

In a development, the step of communicating multipath parameter(s) is performed at a configurable refresh rate.

In a development, the method further comprises the step of a G.N.S.S. receiver receiving multipath parameters and the step of using the position of said G.N.S.S. receiver with the received multipath correction value.

In a variant, the step of estimating multipath correction value comprises the steps of determining at least a first correlation function between a received radiofrequency signal and at least a replica of said signal generated at the receiver, and for at least an output of said first correlation function: performing a cepstrum transform, searching for one or more reflected propagation paths from the output of the spectrum transform, and when reflected propagation paths are detected, determining the associated propagation characteristics, and removing the contribution of the detected reflected propagation paths from one of the received signal or the output of the first correlation function.

In a development, the method further comprises the step of a G.N.S.S. receiver correcting one or more pseudo-distances with said multipath parameters when calculating its spatial position.

In a development, the method further comprises the step of powering off one or more circuits of the G.N.S.S. when multipath parameters exceed one or more predefined values.

In a development, the method further comprises the step of requesting position information from another device connected to the G.N.S.S. receiver.

In a development, the method further comprises the step of, in response of determining multipath parameters above one or more predefined thresholds, activating one or more sensors embedded in the G.N.S.S. receiver, or accessible to it, to improve the precision of the determination of its spatial position and/or clock time.

In a development, a G.N.S.S. spatial position and/or a satellite position is quantized.

In a development, spatial position and clock time of a G.N.S.S. receiver is filtered out before communication to the server.

In a development, locally estimated multipath (e.g. by a receiver) and/or remotely analyzed multipath can be compared against various data, for example (static or dynamic) external data. External data for example can comprise tables of values, or maps with recorded multipath values.

In a development, the method further comprises the step of, in response of determining multipath parameters above a predefined threshold, triggering one or more multipath mitigation steps comprising using narrow correlators and/or Multipath Estimating Delay Lock Loop.

In a development, the method further comprises the step of, in response of tracking a Binary Offset Carrier signal, performing one or more ambiguity resolution steps.

In a development, the method further comprises one or more steps among the step of maximizing the number of measures for one or more G.N.S.S. receivers, or for a selection thereof, the step of maximizing the use of different G.N.S.S. constellations, and/or the step of maximizing the use of different signal frequencies. Signal frequencies can be L band and others.

In a development, the method further comprises the step of estimating a merit factor of multipath correction value as a function of the number of satellites in view and/or of signal to noise ratio.

In a development, estimating multipath parameters comprises applying Multipath Estimating Delay Lock Loop steps.

In a development, the at least one G.N.S.S. receiver receives data from another G.N.S.S. receiver in direct communication with said at least one G.N.S.S. receiver.

In a development, the method further comprises the step of quantizing multipath into severity levels and the step of restituting the severity level for a given spatial position by graphical display, audible sound, haptic feedback or a combination thereof.

In an embodiment, the step of communicating to the server comprises a prior step of authenticating a G.N.S.S. receiver. The (prior) authentication can use one or more of an encryption step (e.g. symmetrical, asymmetrical), a challenge-response verification step, a biometric verification step, etc.

Figure 5:
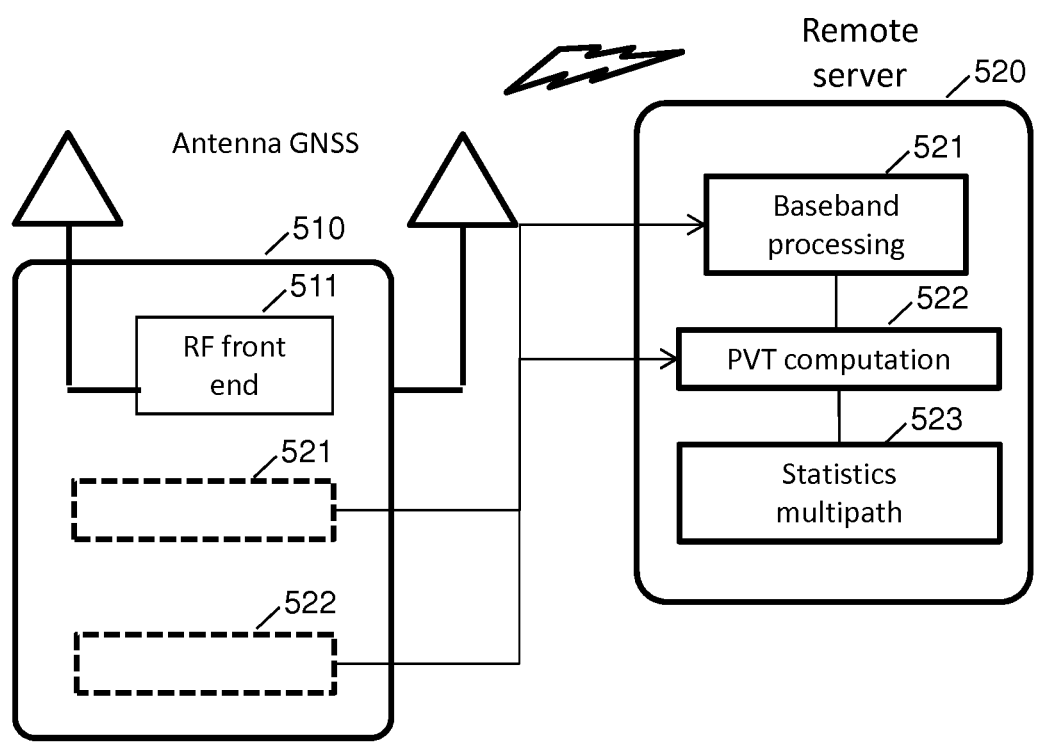
FIG. 5 illustrates a variant of the invention.

FIG. 5 shows some advanced embodiments.

Hardware implementations of the method according to the invention can be very diverse.

In an embodiment ("centralized model"), the role of the remote server (or collection of servers) and the role of a receiver are well defined (i.e. is static and does not change once configured). In yet some other embodiments ("decentralized or distributed models"), these roles of "server" and "receiver" can be diversely allocated or even exchanged over time (e.g. by time intervals, by exchanging tokens, after collective votes, etc). For example, in an embodiment, there is no dedicated remote server hardware in the network (e.g. cloud): the role of the remote server is endorsed by one or more receivers for example in direct communications, which then act as the "intelligent" or processing unit. In a "mesh" or "ad hoc" network of receivers place in a same physical vicinity, peer receivers on the ground can evaluate each other and then vote for the best suitable receiver to endorse the "server" role. This role for example can be endorsed for a limited timeframe. Various mechanisms can allow to re-allocate the role to other nodes or peer receivers, possibly on-the-fly (e.g. with copy of the remote server database, by implementing load-balancing mechanisms, if not some authentication or encryption mechanisms, etc). In some embodiments indeed, the "intelligence" or "processing resources" can be entirely distributed: receivers for example can execute each a part of the remote server role, along their own role of G.N.S.S. receivers (with sufficient redundancy) so that the fleet of temporary peers in a same location can cooperate (e.g. schemes of collaborative G.N.S.S. processing, peer-to-peer processing, cooperative processing).

One or more functions of the server can be distributed across the solicited/solicitable receivers and/or servers. Some receivers for example can perform parts of the computations required or useful to establish the consolidated map.

In yet another embodiment, the method according to the invention does not even require standard or off-the-shelf G.N.S.S. receivers.

FIG. 5 illustrates such an embodiment. A fleet of specific devices 510 adapted so re-transmit a "snapshot" of received G.N.S.S. signals (i.e. the raw data) can be sufficient for one or more remote servers 520 to be able to further perform the steps of the method. The device 510 only comprises a RF frontend 511. The processing steps to determine the spatial position and/or clock time and/or multipath parameters' estimation can be computed by the remote server 520 in the network/cloud. The remote server 520 in this case comprises the circuit(s) or step(s) for baseband processing 521, the circuit(s) or step(s) for PVT computation 522 and the circuit(s) or step(s) for multipath statistics 523. In other words circuits or steps 512/522 can be deported in the network.

In such an embodiment, objects or vehicles on the ground advantageously can be provided with very inexpensive hardware (i.e. instead of a fully featured G.N.S.S. receiver, a thin device 510 configured for receiving, digitizing and re-transmitting a G.N.S.S. signal is only required, i.e. no additional computing resources are required).

The disclosed methods can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A device for handling multipath of a G.N.S.S. signal, said device being configured to:
   receive a plurality of G.N.S.S. signals;
   communicate said plurality of G.N.S.S. signals or a first position and a clock time computed from the plurality of G.N.S.S. signals along with data relative to the presence of multipath in the plurality of G.N.S.S. signals to a remote server for processing; and
   receive processed multipath parameters as determined by the remote server;
   wherein the device is configured to use processed multipath parameters communicated by the remote server to compute an improved spatial position and clock time from the G.N.S.S. signals.

2. The device of claim 1, wherein the data relative to the presence of multipath comprise a delay and amplitude of multipath or multipaths.

3. A system comprising a plurality of devices according to claim 1.

4. The system of claim 3, wherein the remote server is configured to collect G.N.S.S. signals or data relative to the presence of multipaths from the plurality of devices.

5. The system of claim 4, wherein one of the plurality of devices and/or the remote server are configured to exclude one or more satellites from the computation of the improved spatial position and clock time when one or more multipath parameters are determined to be superior to a predefined value.

6. The device of claim 1, wherein the remote server is configured to push processed multipath parameters to at least one device according to claim 1 and/or wherein at least one device according to claim 1 is configured to pull processed multipath parameters from the remote server.

7. The device of claim 1, wherein processed multipath parameters are communicated by the remote server at a configurable refresh rate.

8. The system of claim 3, wherein one of the plurality of devices is configured to power off one or more its circuits when processed multipath parameters exceed one or more predefined values.

9. The system of claim 3, wherein one of the plurality of devices is configured to activate one or more embedded sensors when processed multipath parameters exceed one or more predefined thresholds.

10. The device of claim 1, wherein a spatial position and/or a satellite position is quantized.

11. The device of claim 1, wherein a device according to claim 1 and/or the remote server are configured to maximize the number of multipath estimations, and/or to maximize the number of constellations being used, and/or the step of maximizing the number of signal frequencies.

12. The device of claim 1, wherein a device according to claim 1 and/or the remote server are configured to estimate a merit factor of multipath parameters as a function of the number of satellites in view and/or of signal-to-noise ratio.

13. The device of claim 1, wherein at least two devices according to claim 1 are in direct communication.

14. The device of claim 1, wherein multipath into quantized into severity levels and wherein a device according to claim 1 and/or the remote server are configured to restitute the severity level for a given spatial position by graphical display, audible sound, haptic feedback or a combination thereof.

15. The device of claim 1, said device being further configured to:
   correct one or more pseudo-distances with said processed multipath parameters to compute the improved spatial position and clock time.

* * * * *